(12) United States Patent
Kanosue et al.

(10) Patent No.: US 11,555,533 B2
(45) Date of Patent: Jan. 17, 2023

(54) CHAIN GUIDE

(71) Applicant: TSUBAKIMOTO CHAIN CO., Osaka (JP)

(72) Inventors: Masakazu Kanosue, Osaka (JP); Masanori Watanabe, Saka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/321,631

(22) Filed: May 17, 2021

(65) Prior Publication Data

US 2021/0364066 A1 Nov. 25, 2021

(30) Foreign Application Priority Data

May 25, 2020 (JP) .............................. JP2020-090256

(51) Int. Cl.
  *F16H 7/18* (2006.01)
  *F16H 7/06* (2006.01)
  *F16H 7/08* (2006.01)

(52) U.S. Cl.
  CPC .............. *F16H 7/18* (2013.01); *F16H 7/06* (2013.01); *F16H 7/08* (2013.01); *F16H 2007/0872* (2013.01); *F16H 2007/185* (2013.01)

(58) Field of Classification Search
  CPC ..... F16H 7/06; F16H 7/08; F16H 7/18; F16H 2007/0872; F16H 2007/185; F16H 2007/0893; F16H 2007/0863
  USPC .................................................. 474/111, 140
  See application file for complete search history.

(56) References Cited

U.S. PATENT DOCUMENTS

| | | | | |
|---|---|---|---|---|
| 4,832,664 A * | 5/1989 | Groger | .................... | F01L 1/022 474/140 |
| 5,665,019 A * | 9/1997 | Sheffer | ..................... | F16H 7/24 474/140 |
| 5,846,150 A * | 12/1998 | Wigsten | ..................... | F16H 7/18 474/140 |
| 6,120,403 A | 9/2000 | Suzuki et al. | | |
| 6,312,353 B1 * | 11/2001 | Oba | .......................... | F16H 7/18 474/140 |

(Continued)

FOREIGN PATENT DOCUMENTS

| | | | | |
|---|---|---|---|---|
| DE | 102013100831 A1 * | 7/2014 | .............. | F01L 1/022 |
| GB | 2323893 A * | 10/1998 | ............... | F16H 7/18 |

(Continued)

*Primary Examiner* — Michael R Mansen
*Assistant Examiner* — Raveen J Dias
(74) *Attorney, Agent, or Firm* — WHDA, LLP

(57) ABSTRACT

To provide a chain guide that can improve transportability and assembly operation efficiency, while also ensuring stable running of a timing chain and enhancing durability, with a simple structure. The chain guide has a guide shoe that slidably guides a chain, and a chain guide body that supports the guide shoe. A compression limiter having an attachment hole through which a mounting bolt for attaching the chain guide to an attachment target member passes is fitted in a fixing through hole extending through the chain guide body in a width direction thereof. A compression limiter holding mechanism is provided either to the compression limiter or to a hole rim part including the fixing through hole of the chain guide body in order to hold the compression limiter.

6 Claims, 6 Drawing Sheets

(56) References Cited

U.S. PATENT DOCUMENTS

| | | | | |
|---|---|---|---|---|
| 6,524,202 B1* | 2/2003 | Tada | ............... | F16H 7/08 474/140 |
| 6,572,502 B1* | 6/2003 | Young | ............... | F16H 7/18 474/140 |
| 7,540,817 B2* | 6/2009 | Hashimoto | ............... | F16H 7/0848 192/81 C |
| 8,308,588 B2* | 11/2012 | Hewitt | ............... | F16H 7/18 474/111 |
| 8,393,986 B2* | 3/2013 | Young | ............... | F16H 7/10 474/101 |
| 8,430,773 B2* | 4/2013 | Botez | ............... | F16H 7/18 474/111 |
| 8,858,375 B2* | 10/2014 | Young | ............... | F16H 7/10 474/101 |
| 8,926,461 B2* | 1/2015 | Fuhrmann | ............... | F16H 7/18 474/111 |
| 9,297,406 B2* | 3/2016 | Young | ............... | F16H 7/20 |
| 9,989,130 B2* | 6/2018 | Gomes | ............... | F16H 7/18 |
| 11,248,682 B2* | 2/2022 | Hashimoto | ............... | F16H 7/18 |
| 2005/0117997 A1* | 6/2005 | Pinzl | ............... | F16B 37/005 411/367 |
| 2006/0054121 A1* | 3/2006 | Koch | ............... | F16H 7/18 123/90.17 |
| 2008/0242460 A1* | 10/2008 | Hewitt | ............... | F16H 7/18 474/111 |
| 2009/0036241 A1* | 2/2009 | Hirayama | ............... | F16H 7/18 474/111 |
| 2009/0197724 A1* | 8/2009 | Young | ............... | F16H 7/10 474/133 |
| 2010/0062887 A1* | 3/2010 | Bodensteiner | ............... | F16H 7/08 474/111 |
| 2010/0210384 A1* | 8/2010 | Young | ............... | F16H 7/08 474/111 |
| 2010/0273590 A1* | 10/2010 | Hewitt | ............... | F16H 7/18 474/111 |
| 2010/0292037 A1* | 11/2010 | Botez | ............... | F16H 7/18 474/111 |
| 2011/0152022 A1 | 6/2011 | Yoshimoto et al. | | |
| 2011/0218068 A1* | 9/2011 | Shimosaka | ............... | F16H 7/18 474/140 |
| 2013/0190115 A1* | 7/2013 | Young | ............... | F16B 39/32 474/101 |
| 2014/0302955 A1* | 10/2014 | Weikert | ............... | F16H 7/08 474/111 |
| 2015/0023756 A1* | 1/2015 | Young | ............... | F16H 7/20 411/143 |
| 2017/0037956 A1* | 2/2017 | Mishima | ............... | F01M 1/06 |
| 2017/0114873 A1* | 4/2017 | Hirayama | ............... | F16H 7/18 |
| 2017/0114874 A1 | 4/2017 | Matsushita et al. | | |
| 2020/0362944 A1* | 11/2020 | Hashimoto | ............... | F16H 7/18 |
| 2021/0285537 A1* | 9/2021 | Shimosaka | ............... | F16N 7/24 |
| 2022/0221030 A1* | 7/2022 | Murai | ............... | F16H 7/18 |

FOREIGN PATENT DOCUMENTS

| | | | |
|---|---|---|---|
| JP | 10-238604 A | 9/1998 | |
| JP | 2011-127741 A | 6/2011 | |
| JP | 2017-78486 A | 4/2017 | |
| WO | WO-2014183752 A1 * | 11/2014 | ............... F16H 7/08 |

* cited by examiner

Related Art

CHAIN GUIDE

BACKGROUND OF THE INVENTION

1. Field of the Invention

The present invention relates to a chain guide having a guide shoe that slidably guides a chain, and a chain guide body that supports the guide shoe.

2. Description of the Related Art

It is the common practice to use a chain guide that has a guide shoe slidably guiding a running chain to stabilize the chain running between sprockets and to keep correct tension.

A timing system for an engine such as a system illustrated in FIG. 10 is known, for example, in which an endless drive chain CH, such as a roller chain, is passed around sprockets S1 and S2 respectively attached to a crankshaft and camshafts inside an engine room E. The endless timing chain CH, which is passed around a drive sprocket S1 attached to a crankshaft and a pair of driven sprockets S2 attached to camshafts inside the engine room E, is guided by a pivoting chain guide (pivoting guide) 600 and a chain guide (fixed guide) 500.

A chain tensioner T presses the pivoting guide 600 to keep correct tension of the timing chain CH and to suppress vibration.

In such a timing system, the fixed guide 500 is fixed inside the engine room E by a plurality of fixing mounting bolts Q, while the pivoting guide 600 is mounted inside the engine room E so as to be pivotable around a pivot mounting bolt P in the plane in which the timing chain CH is passed around (see, for example, Japanese Patent Application Laid-open Nos. 2017-078486, 2011-127741, and H10-238604).

A known chain guide (pivoting guide) 600 and chain guide (fixed guide) 500 used in such a timing system have a guide shoe slidably guiding a running chain, and a chain guide body supporting and reinforcing this guide shoe along a chain running direction. The chain guide body is made of synthetic resin. On the other hand, the mounting bolts P and Q used for fixing these chain guides 500 and 600 to the engine room E, which is the attachment target member, are made of metal. The heat during the operation of the timing system causes loosening of the mounting bolts P and Q resulting from the difference in thermal shrinkage between the mounting bolts P and Q and the resin chain guide body. This leads to a problem whereby the mounted chain guides may be loosened, and stable running of the timing chain cannot be ensured.

SUMMARY OF THE INVENTION

An attempt has been made to alleviate this problem of loosening of mounted chain guides resulting from the thermal shrinkage difference, in which a metal bushing made of the same material as that of the mounting bolt is interposed between the inner circumferential surface of a fixing through hole of the chain guide, through which the mounting bolt is passed, and the mounting bolt, so as to reduce the difference in thermal shrinkage between the mounting bolt and the chain guide.

When assembling the chain guide into the engine room that is the attachment target member, the chain guide body and the metal bushing inserted in its fixing through hole are handled in one piece. One problem here is that the metal bushing makes the assembling operation harder, even for an operator using both hands, because the metal bushing can easily fall off during the operation of fastening the mounting bolt into a screw hole formed in the attachment surface of the engine room, with the metal bushing being inserted in the fixing through hole of the chain guide body, resulting in poor work efficiency. There is also the risk that the metal bushings fall off during the transportation of the chain guide.

The present invention solves these problems, and an object thereof is to provide a chain guide that can improve transportability and assembling operation efficiency, while also ensuring stable running of a timing chain and enhancing durability, with a simple structure.

The present invention provides a chain guide including a guide shoe that slidably guides a chain, and a chain guide body that supports the guide shoe, the chain guide further including:

a compression limiter fitted in a fixing through hole extending through the chain guide body in a width direction thereof, and having an attachment hole through which a mounting bolt for attaching the chain guide to an attachment target member passes, and a compression limiter holding mechanism provided either to the compression limiter or to a hole rim part including the fixing through hole of the chain guide body in order to hold the compression limiter, whereby the problems described above are solved.

The chain guide of the present invention is provided with a compression limiter holding mechanism provided either to the compression limiter itself or to a hole rim part including the fixing through hole of the chain guide body in order to hold the compression limiter. The compression limiter interposed between the chain guide body and the mounting bolt basically alleviates the thermal shrinkage difference between the mounting bolt and the chain guide body, so that stable running of the timing chain is ensured and the durability is improved. The compression limiter holding mechanism prevents the compression limiter from falling off of the chain guide body during transportation, so that the transportability is improved. The compression limiter holding mechanism also prevents the compression limiter from falling off of the chain guide body during the mounting thereof to an attachment target member and allows easy assembling to the attachment target member, so that the attachment work efficiency is improved.

According to the chain guide of the present invention in which a tapered part having a diameter decreasing toward one axial side thereof is formed on an inner circumferential surface of the fixing through hole, the compression limiter can be readily held by the tapered part when the compression limiter is fitted into the fixing through hole in the direction in which the diameter thereof decreases, and this way the simple structure can reliably improve attachment work efficiency and transportability.

According to the chain guide of the present invention in which a lip is formed between an annular groove and an inner circumferential surface of the fixing through hole in the hole rim part, the lip that easily deforms and provides a deflection allowance imparts resiliency to the fixing through hole. The resiliency of the fixing through hole reliably retains the compression limiter in the chain guide body, and reliably prevents the compression limiter from falling off of the chain guide body, so that the attachment work efficiency and transportability are further improved. Moreover, with the annular groove serving as an oil reservoir, more oil is kept around the fixing through hole and vibrations are damped better. If the chain guide is used as a fixed guide, wear and breakage risks are reduced, and if the chain guide is used as a pivoting guide, the improved oil lubrication reduces the risk of wear in sliding parts and prolongs the service life.

According to the chain guide of the present invention in which the annular groove is formed of a plurality of split circular arc grooves, with by a bridge structure therebetween, the annular groove can have higher strength because the bridge structure inhibits undulation in the annular groove.

According to the chain guide of the present invention in which the compression limiter is formed with a locking portion that engages with the hole rim part, the compression limiter is reliably prevented from falling off of the chain guide body by the locking portion engaging with the hole rim part when the compression limiter is inserted into the fixing through hole, so that the attachment work efficiency and transportability are further improved.

According to the chain guide of the present invention in which a surface irregularity structure is formed on an inner circumferential surface of the fixing through hole, the friction generated between the surface irregularity structure on the inner circumferential surface of the fixing through hole and the outer circumferential surface of the mounting bolt reliably prevents the compression limiter from falling off of the chain guide body, so that the attachment work efficiency and transportability are further improved.

According to the chain guide of the present invention wherein the hole rim part is formed integrally with the chain guide body, the chain guide can be produced with high productivity with a reduced number of production steps and at lower production cost.

DESCRIPTION OF THE PREFERRED EMBODIMENTS

Figure 1:
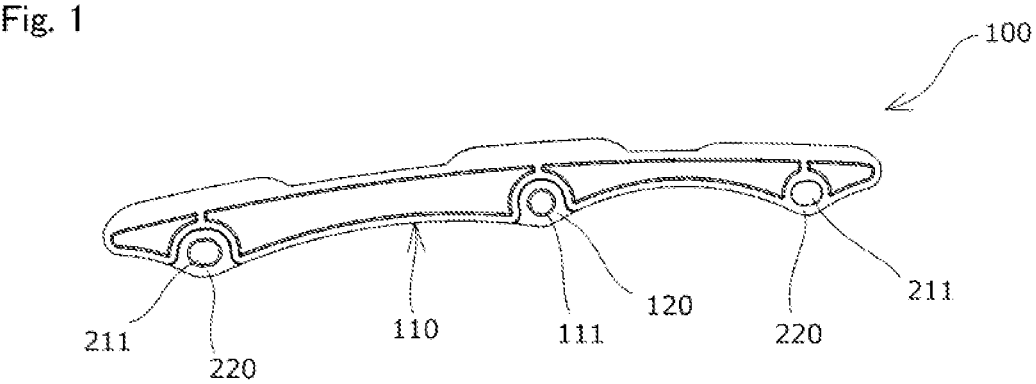
FIG. 1 is a front view illustrating one example of a chain guide (fixed guide)

The chain guide according to the present invention includes: a guide shoe that slidably guides a chain; a chain guide body that supports the guide shoe; a compression limiter fitted in a fixing through hole extending through the chain guide body in a width direction, and having an attachment hole for a mounting bolt to pass through for attaching the chain guide to an attachment target member; and a compression limiter holding mechanism provided to a hole rim part including the fixing through hole of the chain guide body for holding the compression limiter. The compression limiter interposed between the chain guide body and the mounting bolt basically alleviates the thermal shrinkage difference between the mounting bolt and the chain guide body, so that stable running of the timing chain is ensured and the durability is improved. The compression limiter holding mechanism prevents the compression limiter from falling off of the chain guide body during transportation. The compression limiter holding mechanism also prevents the compression limiter from falling off of the chain guide body during the mounting thereof to an attachment target member and allows easy assembling to the attachment target member, so that the attachment work efficiency is improved. The chain guide can have any specific configurations as long as it provides the above effects.

Embodiment 1

The chain guide according to the first embodiment of the present invention is incorporated in a timing system set inside an engine room, fixedly attached inside the engine room that is the attachment target member, to slidably guide a chain that runs between sprockets. The chain guide 100 includes a guide shoe slidably guiding the running chain along a guide longitudinal direction, a chain guide body 110 removably attached to and supporting the guide shoe, and a compression limiter 150 fitted in a fixing through hole 111 extending through the chain guide body 110 in a width direction (guide width direction), and having an attachment hole 151 for a mounting bolt to pass through for attaching the chain guide 100 to an attachment target member.

The chain guide body 110 is made of synthetic resin. In the case where the chain guide 100 is a fixed guide, the chain guide body 110 has the fixing through hole 111 at three locations spaced apart in the guide longitudinal direction of the chain guide body 110 as illustrated in FIG. 1, with a compression limiter 150 fitted in each through hole.

Figure 2:
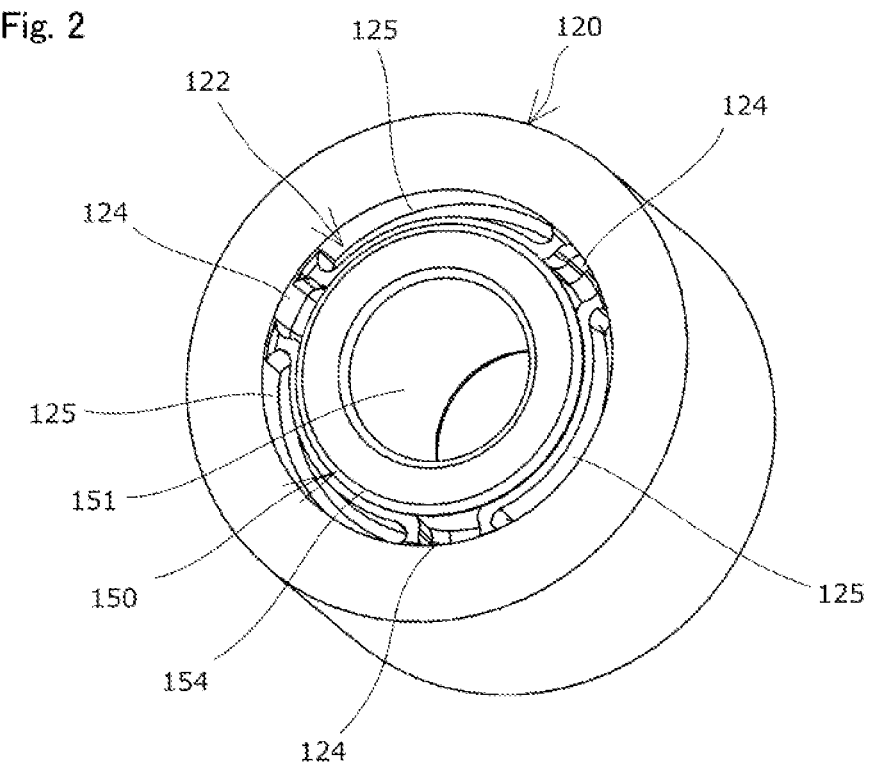
FIG. 2 is a perspective view of a hole rim part and a compression limiter of the chain guide according to a first embodiment of the present invention.
Figure 3:
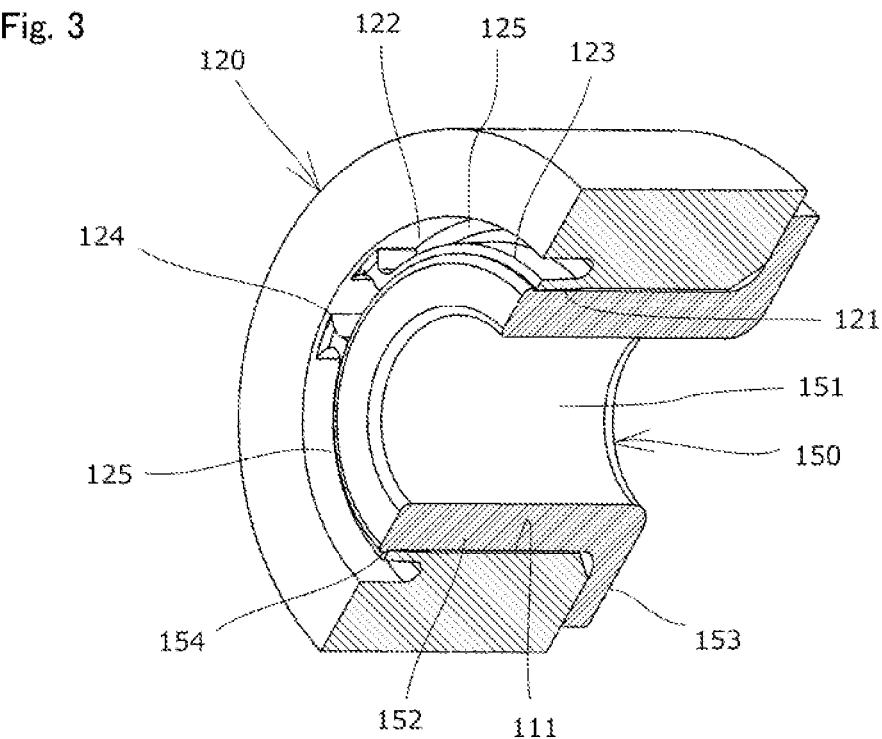
FIG. 3 is a perspective cross-sectional view of the hole rim part and compression limiter of FIG. 2.
Figure 4:
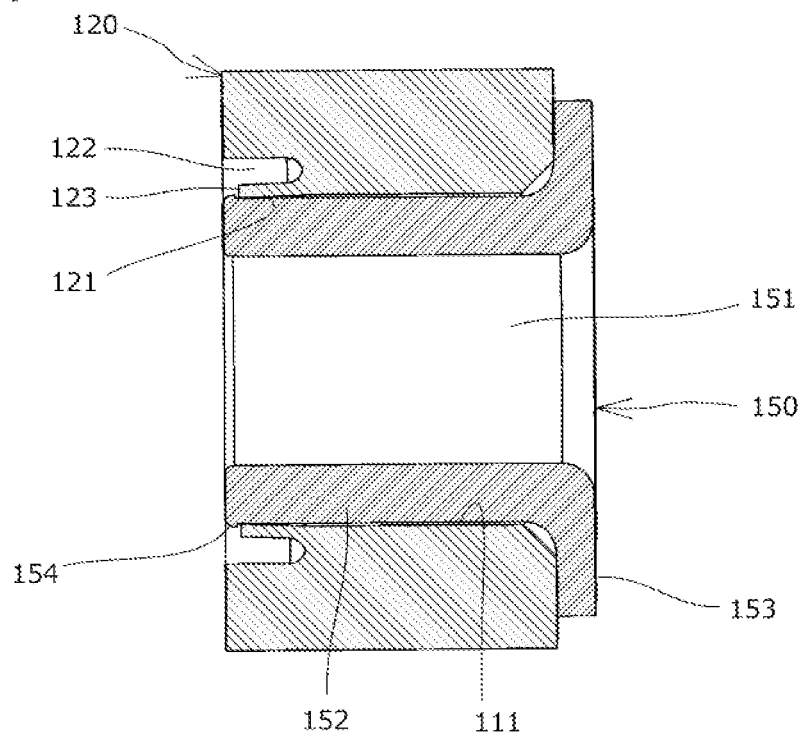
FIG. 4 is a cross-sectional view of the hole rim part and compression limiter of FIG. 2.

In the hole rim part 120 including the fixing through hole 111 of the chain guide body 110, as illustrated in FIG. 2 to FIG. 4, the inner circumferential surface of the fixing through hole 111 is provided with a tapered part 121 in a tapered shape having a diameter decreasing toward one axial side (from right to left in FIG. 4) of the fixing through hole 111.

In the hole rim part 120, an annular groove 122 is hollowed into the chain guide body 110 in the width direction from one side thereof (left side in FIG. 4), conforming to the outer rim shape (circular) at one end of the fixing through hole 111 and spaced apart from the outer rim of the fixing through hole 111 with a small gap therebetween. The inner ring circumferential wall of this annular groove 122 on the side closer to the fixing through hole 111 forms a lip 123 between the annular groove 122 and the inner circumferential surface of the fixing through hole 111.

The lip 123 is formed to the tapered part 121 so that it extends inside the fixing through hole 111 such as to be slightly inclined radially inward of the fixing through hole 111 from the other side (right side in FIG. 4) to one side (left side in FIG. 4).

The lip 123 that is the inner ring circumferential wall of the annular groove 122 has a length (in the left and right direction in FIG. 4) that is smaller than the height of the chain guide body 110 that forms the outer ring circumferential wall of the annular groove 122. This prevents the compression limiter 150 from sticking out of the chain guide body 110 when a locking portion 154 to be described later of the compression limiter 150 engages with the lip 123 such as to cover the inner circumferential region at the tip of the lip.

The lip 123 has a thickness of about 0.5 mm, for example, and a length along the guide width direction of about 2.0 mm, for example.

The annular groove 122 is made up of a plurality of split circular arc grooves 125 connected by bridge structures 124. The plurality of circular arc grooves 125 are provided at equiangular points of the annular groove 122.

Figure 5:
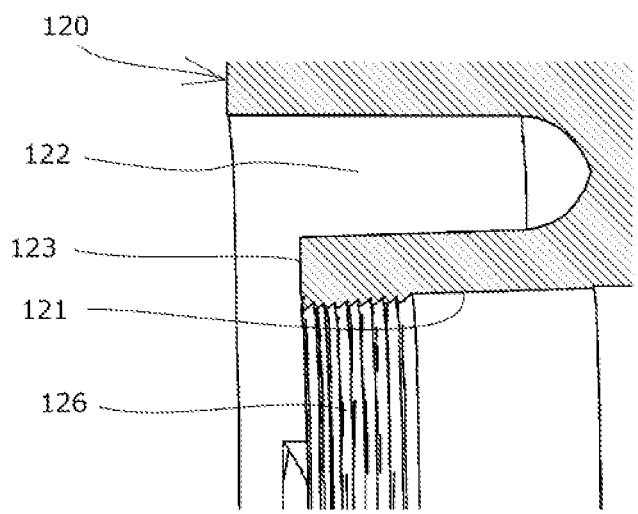
FIG. 5 is a partially cross-sectional view illustrating a portion of the hole rim part of FIG. 2 to a larger scale.

The inner circumferential surface of the fixing through hole 111, specifically, the inner circumferential surface of the lip 123 of the tapered part 121, is formed with a surface irregularity structure 126 as illustrated in FIG. 5.

The compression limiter 150 is made of the same metal as that of the mounting bolt used for attaching the chain guide to the engine room that is the attachment target member, and provided for preventing deformation resulting from a difference in thermal shrinkage between the synthetic resin chain guide body 110 and the mounting bolt.

The compression limiter 150 includes a cylindrical tube body 152, the inside of which is the attachment hole 151, a flange part 153 protruding radially outward from the base end edge of this tube body 152, and a locking portion 154 slightly protruding radially outward from the distal end edge of the tube body 152. The attachment hole 151 serves as an attachment hole for a mounting bolt to pass through, which is the mounting shaft for attaching the chain guide 100 to the engine room that is the attachment target member.

The locking portion 154 of the compression limiter 150 is configured to engage with one side of the hole rim part 120 of the chain guide body 110, specifically to hook on the lip 123, covering the inner circumferential region at the tip of the lip 123 of the hole rim part 120. Namely, the compression limiter 150 is formed such as to be able to clip on the fixing through hole 111 by the flange part 153 and the locking portion 154.

The locking portion 154 of the compression limiter 150 has a protruding length of about 0.1 mm.

Figure 6:
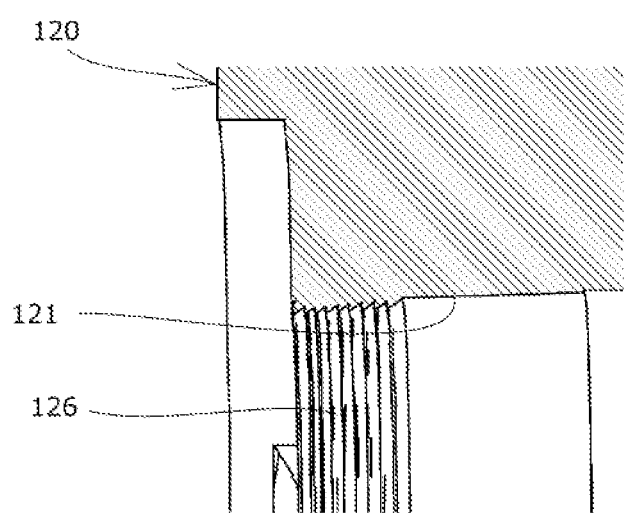
FIG. 6 is a perspective view illustrating another example of a fixing through hole.

The chain guide 100 of this embodiment is provided with a compression limiter holding mechanism in the hole rim part 120 including the fixing through hole 111 of the chain guide body 110 for holding the compression limiter 150. The compression limiter holding mechanism is formed by at least one of the tapered part 121 of the hole rim part 120, the lip 123 and the surface irregularity structure 126, and the locking portion 154 of the compression limiter. While the chain guide 100 according to this embodiment is described as having all of these, the function of holding the compression limiter can be achieved by any one of these. For example, as illustrated in FIG. 6, only the tapered part 121 and the surface irregularity structure 126 may be provided, without the annular groove 122 (lip 123).

The compression limiter 150 can be assembled to the chain guide body 110 by press-fitting the compression limiter 150 from the distal end thereof (where there is the locking portion 154) into the fixing through hole 111 from the other side toward one side of the chain guide body 110, in an orientation in which the center axis of the fixing through hole 111 substantially coincides with the center axis of the tube body 152.

Once the compression limiter 150 is inserted into the fixing through hole 111, the compression limiter 150 is held inside the fixing through hole 111 by the compression limiter holding mechanism. Specifically, the resiliency of the tapered part 121 and the lip 123 of the fixing through hole 111 and the friction enhanced by the surface irregularity structure 126 keep the tube body 152 of the compression limiter 150 in position. Moreover, while the flange part 153 makes contact with the other side of the chain guide body 110, the locking portion 154 of the compression limiter 150 protrudes from one side of the fixing through hole 111 and hooks on the lip 123, covering the inner circumferential region at the tip of the lip 123 of the hole rim part 120. This restricts the movement of the compression limiter 150 and prevents the compression limiter 150 from falling off of the chain guide foody 110. The chain guide 100 can thus be fastened to the engine room as one piece, and the chain guide 100 can be readily fixed inside the engine room without a complex operation so that the work efficiency associated with the mounting of the chain guide 100 is improved.

The chain guide 100 is mounted by fitting the compression limiter 150 into each fixing through hole 111 and by fastening mounting bolts (not shown) through respective attachment holes 151 of the compression limiters 150 into screw holes (not shown) in the engine room. Thus, the chain guide is mounted, with the tube body 152 of the compression limiter 150 being interposed between the inner circumferential surface of each fixing through hole 111 formed in the chain guide body 110 and the mounting bolt.

The chain guide 100 may be assembled into the engine room such that the flange part 153 of the compression limiter 150 faces into the engine room so that the flange part will function as a part in contact with the engine room when the chain guide 100 is attached in the engine room. Alternatively, the locking portion 154 of the compression limiter 150 may be arranged to face into the engine room.

Figure 7:
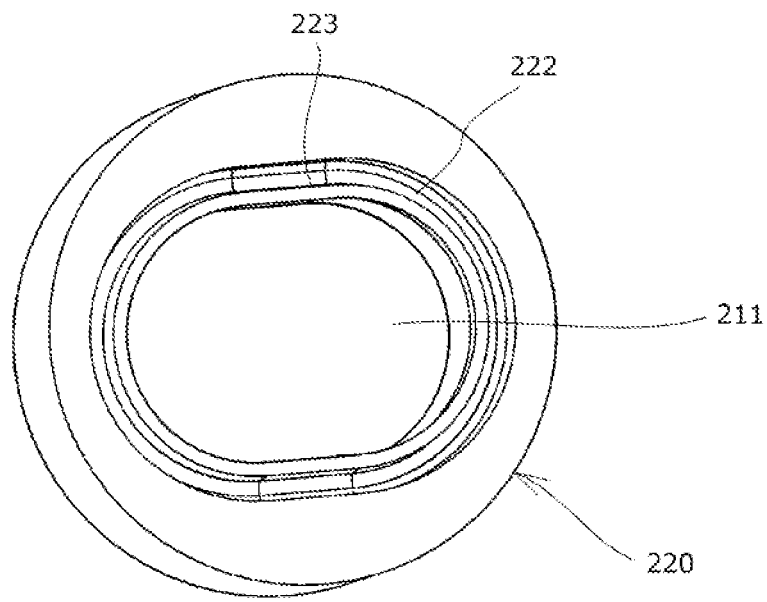
FIG. 7 is a partially cross-sectional view illustrating a variation example of the hole rim part of the chain guide according to the first embodiment of the present invention.

The through hole described above is the one of three fixing through holes 111 of the chain guide 100 in FIG. 1 located in the middle and having a cylindrical shape with a circular cross section perpendicular to the axial direction. The present invention is also applicable to the other two fixing through holes 211 having an obround cylindrical shape with an obround cross section perpendicular to the axial direction as shown in FIG. 7. In the hole rim part 220 including the fixing through hole 211 in FIG. 7, an annular groove 222 is hollowed into the chain guide body 110 in the width direction from one side thereof (front side in FIG. 7), conforming to the outer rim shape (obround) at one end of the fixing through hole 211 and spaced apart from the outer rim of the fixing through hole 211 with a small gap therebetween. The inner ring circumferential wall of this annular groove 222 on the side closer to the fixing through hole 211 forms a lip 223 between the annular groove 222 and the inner circumferential surface of the fixing through hole 211.

The chain guide 100 in this embodiment has the fixing through holes 211 in an obround cylindrical shape having an obround cross section perpendicular to the axial direction positioned at both ends in the guide longitudinal direction.

Embodiment 2

Figure 8:
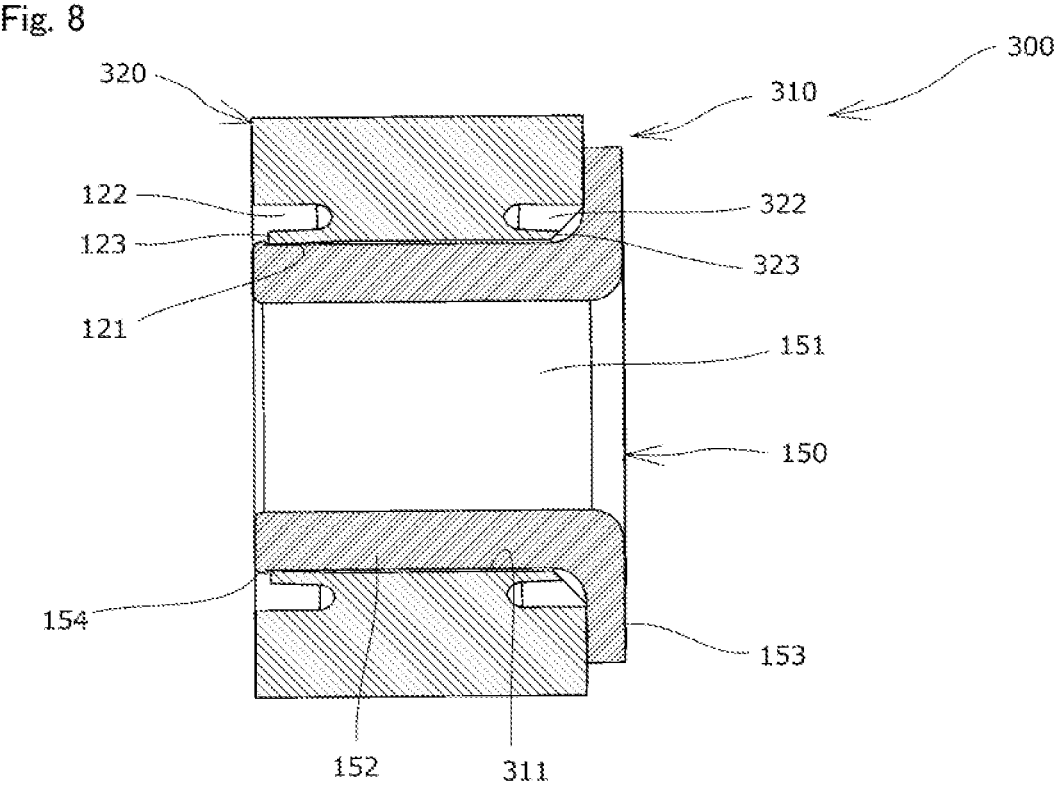
FIG. 8 is a cross-sectional view of a hole rim part and a compression limiter of a chain guide according to a second embodiment of the present invention.

The chain guide 300 according to the second embodiment of the present invention includes, in addition to the annular groove 122 hollowed into the chain guide body 310 from one side in the hole rim part 320, another annular groove 322 hollowed into the chain guide body 310 from the other side, as illustrated in FIG. 8. Other configurations are the same as those of the first embodiment. In FIG. 8 that illustrates the second embodiment, the same elements as those of the chain guide 100 according to the first embodiment are given the same reference numerals.

Specifically, the annular groove 322 is hollowed into the chain guide body 310 in the width direction from the other side (right side in FIG. 8) thereof, conforming to the outer rim shape (obround) at one end of the fixing through hole 311 and spaced apart from the outer rim of the fixing through hole 311 with a small gap therebetween. The inner ring circumferential wall of this annular groove 322 on the side closer to the fixing through hole 311 forms a lip 323 between the annular groove 322 and the inner circumferential surface of the fixing through hole 311.

In the chain guide 300 having the annular grooves 122 and 322 on both sides, the lips 123 and 323 on both sides of the fixing through hole 311 easily deform and provide a deflection allowance, imparting resiliency to the fixing through hole 311. The resiliency of the fixing through hole 311 reliably retains the compression limiter 150 in the chain guide body 310, and reliably prevents the compression limiter 150 from falling off of the chain guide body 310, so that the attachment work efficiency and transportability are further improved. Moreover, both annular grooves 122 and 322 serve as an oil reservoir so that more oil is kept around the fixing through hole 311 and vibrations are damped better, and the improved oil lubrication reduces the risk of wear in sliding parts and prolongs the service life.

While embodiments of the present invention have been described above in detail, the present invention is not limited to the embodiments described above. Various design changes may be made without departing from the scope of the present invention set forth in the claims.

Figure 9:
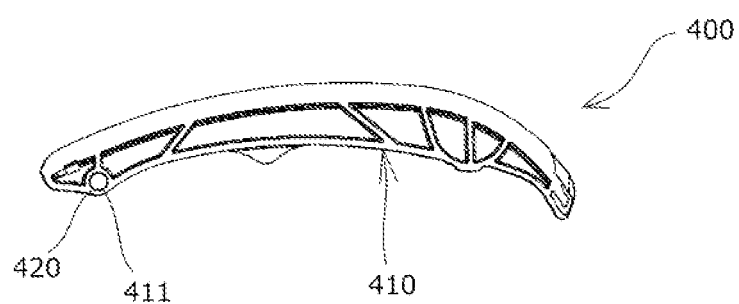
FIG. 9 is a front view illustrating one example of a chain guide (pivoting guide)
Figure 10:
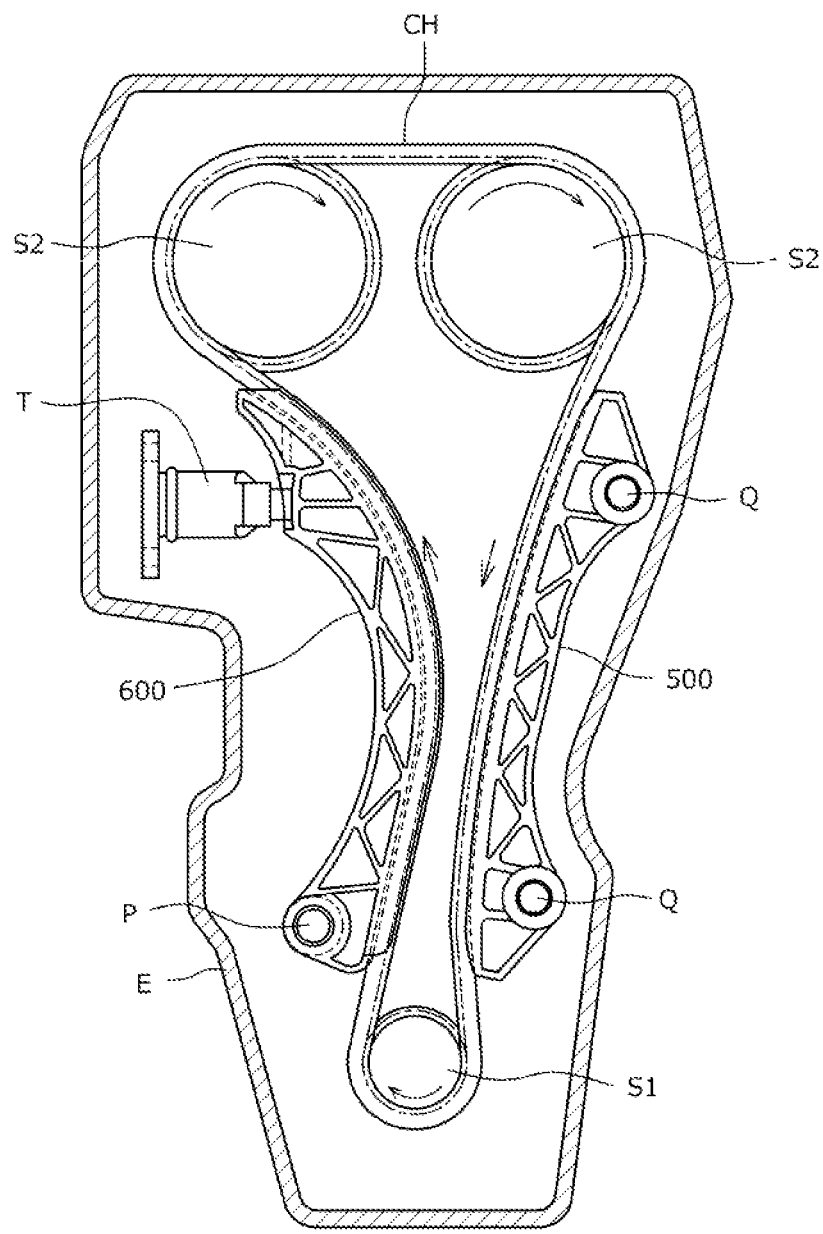
FIG. 10 is an illustrative view of a conventional timing system of an engine.

For example, while the chain guide in the embodiments described above is configured as a fixed guide, the compression limiter holding mechanism according to the present invention is applicable also to a pivoting guide pivotably supported inside the engine room such as the one shown in FIG. 9. The chain guide 400 configured as a pivoting guide includes a chain guide body 410, and a compression limiter 150 fitted in one fixing through hole 411 provided at one end in the guide longitudinal direction of the chain guide body 410. The compression limiter 150 has an attachment hole 151, serving also as a pivot hole, for a mounting bolt or the like serving as the pivot shaft to pass through for attaching the chain guide to an attachment target member. The chain guide 400 is provided with a compression limiter holding mechanism either to the hole rim part 420 including this fixing through hole 411 and/or the compression limiter 150.

The tube body of the compression limiter 150 has an axial length that is equal to or slightly longer than the thickness in the width direction of the chain guide body 410 so as to allow the chain guide 400 to freely rotate around the mounting bolt as the pivot when the mounting bolt is secured to the engine room, while restricting the axial movement of the chain guide between the head of the mounting bolt and the attachment surface of the engine room.

The chain guide 400 is mounted by fitting the compression limiter 150 into the fixing through hole 411 and by fastening a mounting bolt (not shown) through the attachment hole 151 of the compression limiter 150 into a screw hole (not shown) in the engine room. Thus, the chain guide is mounted such as to be pivotable in the engine room, with the tube body of the compression limiter 150 being interposed between the inner circumferential surface of the fixing through hole 411 formed in the chain guide body 410 and the mounting bolt.

While the chain guide in the embodiments described above has the hole rim part integrally formed with the chain guide body, the hole rim part may be configured separately, for example. Specifically, the hole rim part may be an independent hole rim component having the fixing through hole, and the chain guide body may be made up of a chain guide body frame having a receiving hole for receiving the hole rim component, and the hole rim component. A chain guide with such a hole rim part separately formed from the chain guide body frame of the chain guide body can be produced with high productivity because the compression limiter holding mechanism is provided only to the hole rim part (hole rim component), which makes the processing and production easy.

While the chain guide is provided inside an engine that has a timing system in the embodiments described above, the chain guide is applicable not only to this but to various equipment.

For example, the chain guide is applicable in various industrial fields including similar drive mechanisms using not only chains, but also belts, ropes and the like.

Moreover, the material of the chain guide body, for example, may be selected from known suitable synthetic resins in accordance with various conditions such as rigidity, durability, formability, elasticity, cost, and so on. Further, the material of the guide shoe may be selected from known suitable materials in accordance with various conditions such as elasticity, friction resistance, rigidity, durability, formability, cost, and so on. Synthetic resin materials are particularly suitable.

What is claimed is:

1. A chain guide comprising:
a guide shoe that slidably guides a chain;
a chain guide body that supports the guide shoe,
the chain guide further comprising:
a compression limiter fitted in a fixing through hole extending through the chain guide body in a width direction thereof, and having an attachment hole through which a mounting bolt for attaching the chain guide to an attachment target member passes; and
a compression limiter holding mechanism provided at least to a hole rim part including the fixing through hole of the chain guide body in order to hold the compression limiter,
wherein the compression limiter holding mechanism is configured by a lip formed between an annular groove and an inner circumferential surface of the fixing through hole; and in the hole rim part, the annular groove being hollowed into the chain guide body in the width direction thereof from one end of the fixing through hole, and
wherein the lip is formed of an inner ring circumferential wall of the annular groove on a side closer to the fixing through hole and extends over the entire circumference of the inner circumferential surface of the fixing through hole.

2. The chain guide according to claim 1, wherein the compression limiter holding mechanism is formed by a tapered part having a diameter decreasing toward one axial side thereof on the inner circumferential surface of the fixing through hole.

3. The chain guide according to claim 1, wherein the annular groove is formed of a plurality of split circular arc grooves, with a bridge structure therebetween.

4. The chain guide according to claim 1, wherein
the compression limiter is provided with a flange part protruding radially outward from a base end edge thereof, and a locking portion protruding radially outward from a distal end edge thereof to engage with the hole rim part, and the compression limiter holding mechanism is formed by the engagement between the locking portion of the compression limiter and the lip of the hole rim part.

5. The chain guide according to claim 1, wherein the compression limiter holding mechanism is formed by a surface irregularity structure formed on the inner circumferential surface of the fixing through hole.

6. The chain guide according to claim 1, wherein the hole rim part is formed integrally with the chain guide body.

\* \* \* \* \*